United States Patent [19]

Lahr

[11] Patent Number: 4,591,949
[45] Date of Patent: May 27, 1986

[54] MODULAR PATCHBOARD FOR ELECTRICAL DEVICES

[76] Inventor: Roy J. Lahr, 944 Hammond St., Los Angeles, Calif. 90069

[21] Appl. No.: 715,593

[22] Filed: Mar. 25, 1985

Related U.S. Application Data

[63] Continuation of Ser. No. 427,562, Jun. 29, 1982, abandoned.

[51] Int. Cl.⁴ .............................................. H02B 1/04
[52] U.S. Cl. .................................. 361/394; 312/234.4; 339/198 GA; 361/331; 361/380; 361/419; 361/429
[58] Field of Search ............... 211/182, 189; 248/27.1; 312/234.4, 257 S K, 223; 174/50, 58; 339/198 G, 198 GA, 121, 125 R, 113 B; 361/331, 364, 365, 369, 376, 380, 393, 394, 396, 386, 417, 420, 426, 427, 419, 429, 428, 332, 334, 390, 391, 347, 348, 349

[56] References Cited

U.S. PATENT DOCUMENTS

| | | | |
|---|---|---|---|
| 2,630,096 | 3/1953 | Conley | 312/234.4 |
| 3,467,891 | 9/1969 | Mogle | 361/386 |
| 3,559,813 | 2/1971 | Sosinski | 339/198 GA |
| 3,760,232 | 9/1973 | Swindell | 361/429 |
| 3,908,563 | 9/1975 | Eckart, Jr. | 312/234.4 |
| 3,943,412 | 3/1976 | Wickstrom | 361/331 |

FOREIGN PATENT DOCUMENTS 1466868  1/1967  France ................................. 339/121

*Primary Examiner*—G. P. Tolin

[57] ABSTRACT

A modular patchboard arrangement for arranging a plurality of electrical devices in a selectably alterable arrangement. In one embodiment, a plurality of modules, each having a predetermined height, are each provided with selectable numbers and types of the electrical devices. Each module is provided on opposite edges thereof with a mounting portion which is adapted to engage an associated rail. Additional levels of modules may be provided, adjacent levels sharing a rail. Each such level may consist of modules of correspondingly different dimensions, for accommodating different types and numbers of electrical devices. In some embodiments, a strip of elastomeric material is interposed between adjacent ones of the modules for closing gaps therebetween.

9 Claims, 5 Drawing Figures

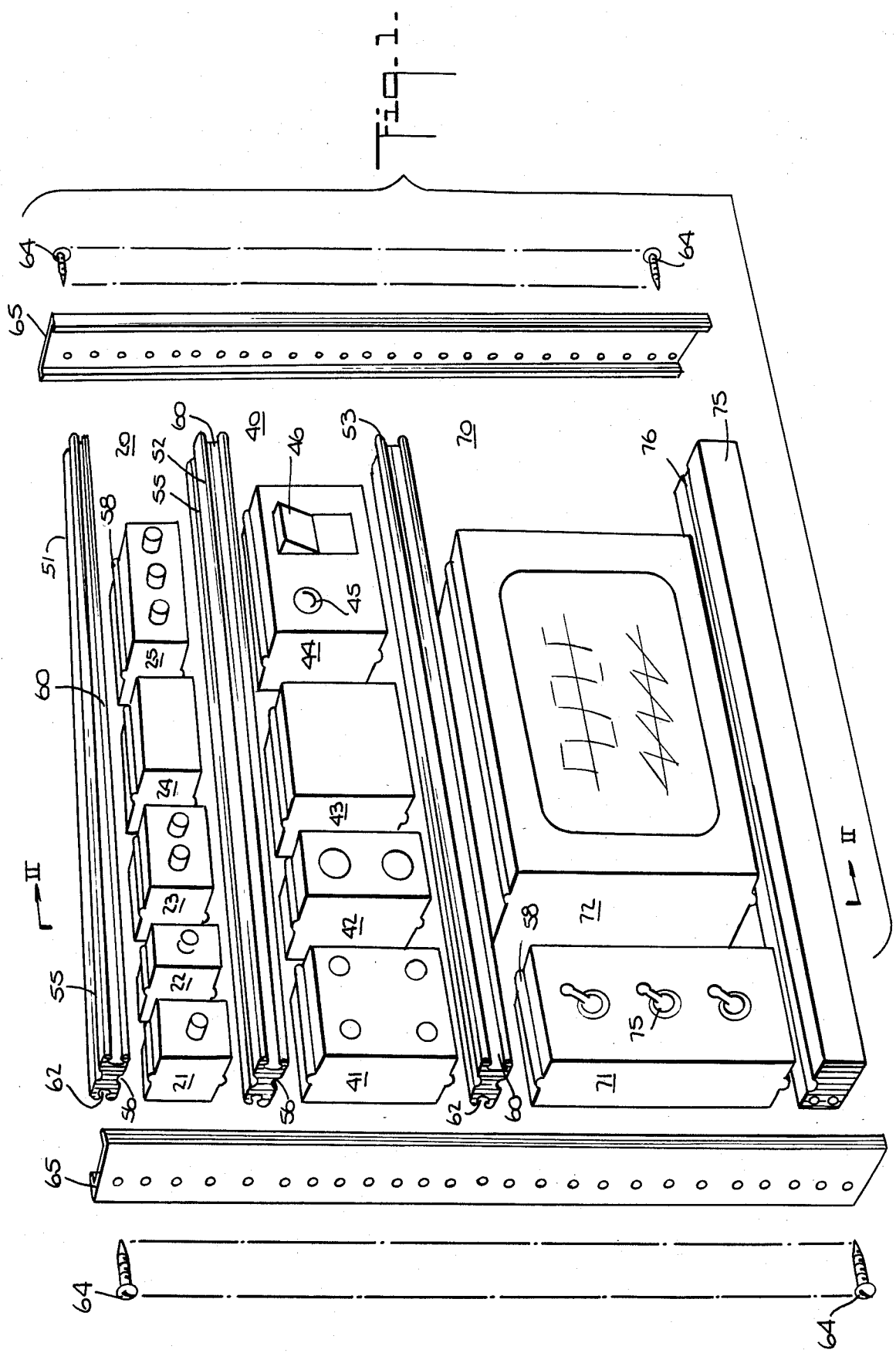

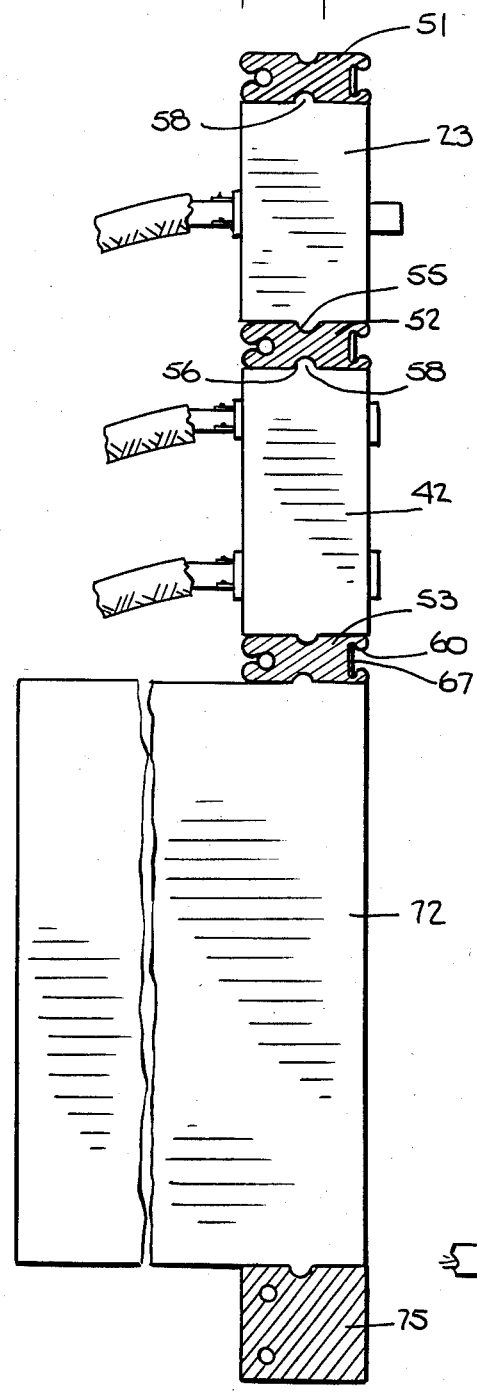
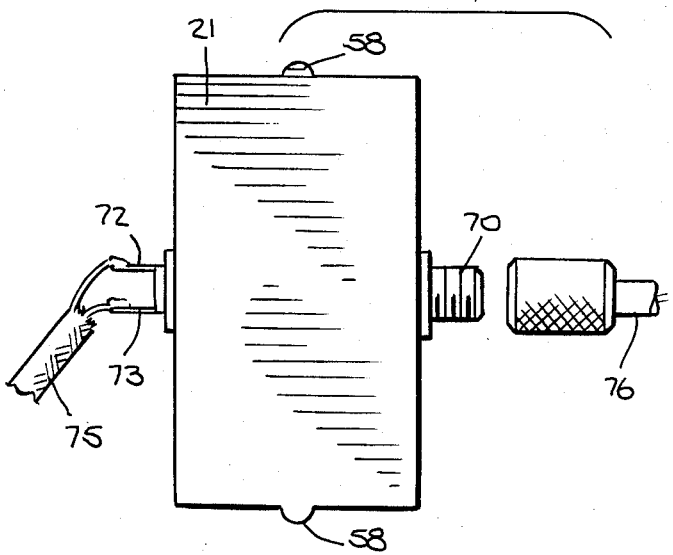
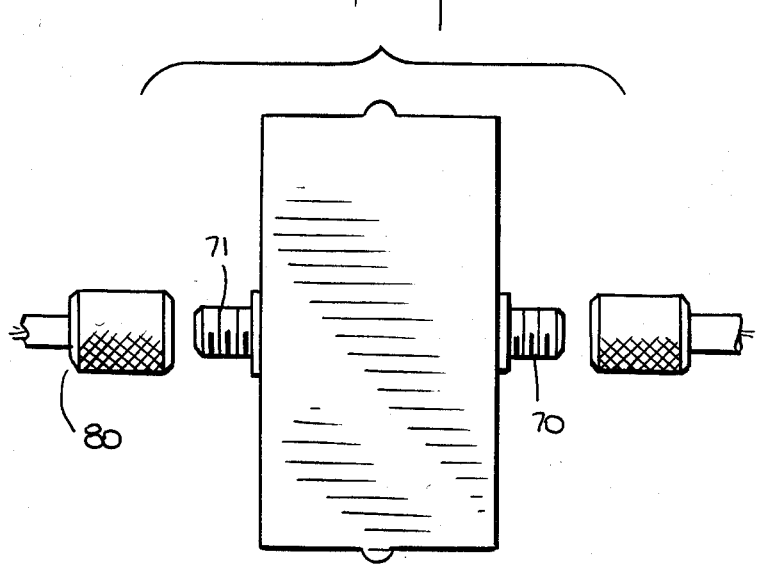

MODULAR PATCHBOARD FOR ELECTRICAL DEVICES

This application is a continuation of application Ser. No. 427,562 filed 6/29/82 now abandoned.

BACKGROUND OF THE INVENTION

1. Field of the Invention

This invention relates generally to arrangements for electrically interconnnecting electronic components, and more particularly, to a modularized patchboard arrangement which can be configured for a specific patchboard application, and which can be modified as required.

2. Description of the Prior Art

The generally known approach for providing patchboard interconnection capability to an arrangement of electronic components has included the use of prefabricated, or customized, boards which are predrilled to contain a specific number and arrangment of jacks, switches, controls, and indicators.

Another known approach utilizes relatively inflexible predrilled patch panels which have a standard width for mounting on a conventional 19" relay rack panel. Although the 19" relay rack panel configuration has achieved a measure of acceptance in industry, not all industrial or commercial users wish to utilize the 19" relay rack panel. In addition, there is a growing need for custom patch panels which can be used in non-industrial environments, such as in the home, to interconnect a variety of consumer products, such as video tape recorders, cameras, antennas, audio components, and even micro-computer systems and peripheral equipment.

Each of the known patchboard systems has advantages and serious drawbacks. Custom fabricated patchboards, for example, can be configured to the specific needs of the user, and offer a good appearance which is an advantage in non-laboratory equipment, and in the home. However, custom panels are expensive to produce because someone must design the ensemble diagram for the custom-drilled plate, arrange for the necessary machine-shop work, and then arrange for an electrical/electronic assembler to complete the patchboard. In addition, even in situations where an area for future expansion is left on a completed custom-drilled panel plate, the plate cannot be adapted inexpensively when changes in, or additions to, the interconnected electronic components are required. With respect to the standard 19" relay rack panels, the relatively low cost of such panels is offset by an unsightly appearance and the need to conform to the 19" relay rack panel width convention. In addition, the conventional relay rack predrilled patchboard modules cannot always be adapted to accommodate the required wide variety of connectors. Such connectors may include, for example, RCA or "phono" jacks for audio signals, BNC jacks for video singals, and UHF-series jacks for modulated RF. Moreover, such predrilled modules cannot usually be adapted easily to accommodate foreign connectors, such as DIN-type connectors. Of course, neither the custom drilled nor the standard relay rack panels are easily adapted to situations where one or more of the interconnected components are permanently removed. In such a case, unsightly holes, hole plugs, or unused connectors remain visible on the patchboard, unless the entire custom drilled panel or module is replaced. This often occurs in situations where the type and nature of components in a system are projected during the design stage of the system, and design changes are mandated by deficiencies which become evident when the system is used, or by advances in the state of the art.

It is a further problem with known patchboard systems that a considerable amount of "back-side" wiring is required to connect the rear of each connector on the unseen side of the patchboard with the appropriate electronic components and with each other. Such wiring, which usually entails soldering, requires substantial effort and technical skill to rework the panel to accommodate changes in the future.

It is, therefore, an object of this invention to provide a patchboard arrangement which can be adapted easily and inexpensively to variations in the electronic components being interconnected.

It is a further object of this invention to provide a patchboard panel arrangement which can accommodate any type of known connector jack, as well as other components such as switches and indicators.

It is a still further object of this invention to provide a modularized patchboard panel which can be rearranged without the inconvenience of soldering and desoldering.

It is another object of this invention to provide a modular patchboard system which can be configured in any predetermined width, selectable ones of the modules being easily removed or replaced.

It is yet another object of this invention to provide a modular patchboard arrangement for interconnecting a system of electronic components, wherein permanent removal of one or more such electronic components from the system will not require replacement of unaffected connectors on the patchboard.

It it still another object of the invention to provide a modularized system wherein any combination of jacks, plugs, lamps, switches, and electronic components, such as amplifiers and video monitors, can be configured and reconfigured, simply and inexpensively.

SUMMARY OF THE INVENTION

The foregoing and other objects are achieved by this invention which provides a modular patchboard system of the type wherein a plurality of electrical devices are distributed over a predetermined patchboard area. The modular patchboard is provided with several modules, each of which is adaptable to contain a predetermined number of electrical devices such as connectors, lamps, switches, electronic components or electronic subsystems. Each module is provided on opposing edges thereof with a mounting arrangement. In one embodiment, the mounting arrangement may be one or more raised portions. The modular patchboard is further provided with at least one pair of elongated rails, each such rail having, in one embodiment, an elongated depression which engages the raised portion on an associated edge of the module. Thus, the elongated rails are arranged parallel to one another and at a predetermined distance which corresponds to the height of the modules so that the modules are accommodated therebetween.

As indicated, some of the modules may be provided with one or more connector portions for achieving an electrical interconnection. Other ones of the modules may contain electronic equipment such as amplifiers, signal processors, video monitors, meters, displays, etc. It may also be desirable, in some embodiments, to provide blank, undrilled modules to occupy unused space on the patchboard and to accommodate future system changes. The connectors which are mounted on the modules may be selectably of the single-sided type or of the dual-sided type. Single-sided type connectors generally require the connections on the backside to be soldered. Although dual-sided connectors are generally more expensive than single-sided connectors, the backside connections can be easily removed, replaced, or rearranged. Generally, the savings in labor costs which are achieved by the use of dual-sided connectors compensate for their greater initial cost. In addition, however, dual-sided connectors provided improved performance with better shielding and impedance control. This results partially from the fact that the manufacturer's components are more uniformly controlled in terms of quality and performance than handwired components.

In a further embodiment of the invention, at least one of the elongated rails is provided with grooves on both sides thereof for engaging the modules. Thus, several rows of modules may be arranged so that adjacent ones of the rows share an elongated rail. Selected ones of the elongated rails may be provided with a groove or depression on the front side for accommodating one or more labels which identify the connectors or other components on the modules. Such labels would be easily removed or replaced when the associated module is removed or replaced. Additionally, the rows of modules may be color-coded to facilitate identification of the connectors by function or by the particular variety of signals they handle.

In another embodiment of the invention, flexible filler strips which may be formed of an elastomeric material may be interposed between the vertical ends of adjacent modules to close any gaps which may be present and to improve the appearance of the assembled patchboards. Such filler strips may be provided in stock lengths which correspond to predetermined module heights, or in long strips which are cut to size by the installer. Moreover, the strips may have a cross-sectional configuration which complements a predetermined edge configuration of the modules, thereby ensuring a good intermodule seal. Finally, such strips reduce overall patchboard costs by permitting tolerance limits to be relaxed; the tolerances being taken up by the flexible strips.

It is, therefore, a feature of this invention that a greater degree of modularization can be achieved over known modular arrangements. Even a module having a single connector jack can be advantageously removed from the arrangement, or replaced by a module containing a different type of jack.

It is also a feature of this invention that, in embodiments which utilize dual-sided connectors, the arrangement can easily be reconfigured without soldering and desoldering. Moreover, the labels which identify particular ones of the modules can easily be changed accordingly.

It is a further feature of this invention that the elongated rails may be formed by extrusion technique. This avoids the need for any machining and requires only that the rails be cut to length.

BRIEF DESCRIPTION OF THE DRAWINGS

Comprehension of the invention is facilitated by reading the following detailed description in conjunction with the annexed drawings, in which:

FIG. 1 is an exploded perspective view of an embodiment of the invention showing three rows of modules and a variety of connector jacks, switches, and indicators;

FIG. 2 is a cross-sectional representation of the assembled embodiment of FIG. 1 taken along line II—II;

FIG. 3 is a cross-sectional representation of a module having a single-sided connector;

FIG. 4 is a cross-sectional representation of a module having a dual-sided connector.

DETAILED DESCRIPTION

Figure 5:
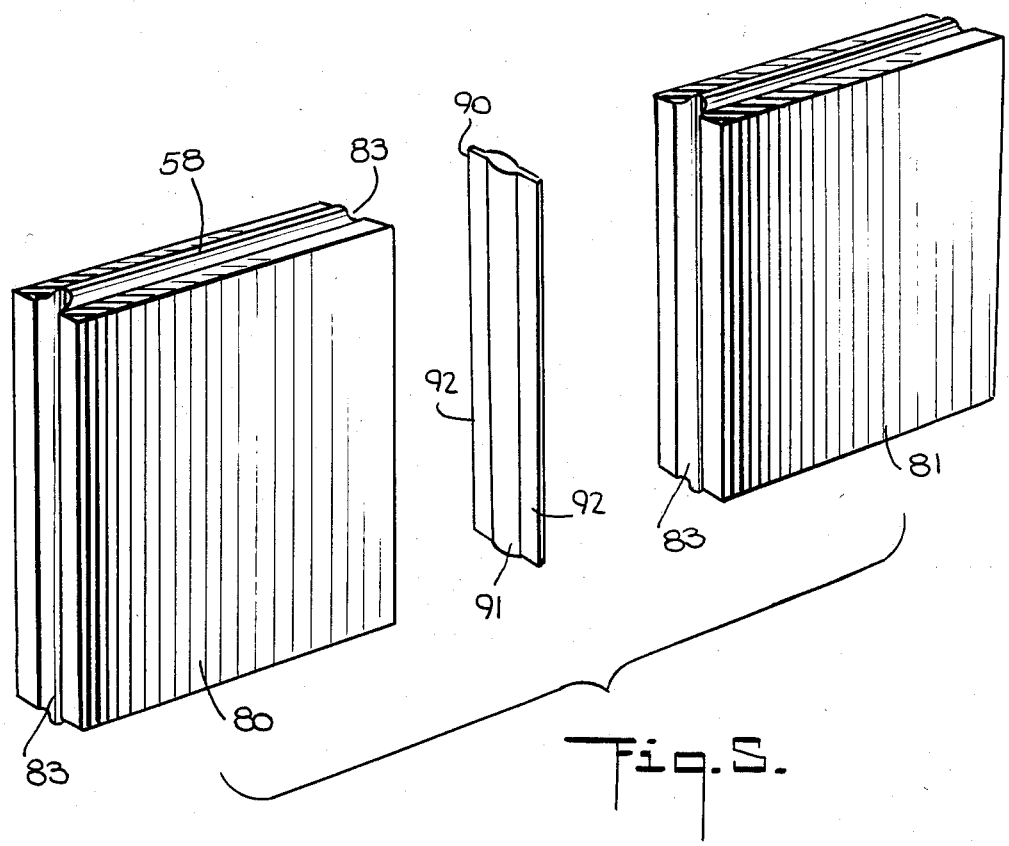
FIG. 5 is an exploded perspective view of an embodiment having flexible filler strips.

FIG. 1 shows an arrangement of modules configured in accordance with the principles of the invention. In the specific illustrative embodiment, three levels of modules, 20, 40 and 70, are shown. Each such level, in this embodiment, is provided with a plurality of modules. As shown, the modules of levels 20 and 40 have shorter heights than those of level 70. Of course, in some embodiments the various levels of modules may each have the same height, or only one such level may be provided. Alternatively, rows of the modules may be arranged vertically rather than horizontally as shown.

Referring to level 20 of FIG. 1, a plurality of modules 21–25 are shown, the modules being axially aligned with one another. In this embodiment, module 21 is shown to have a UHF jack; module 22 has an F-type jack; module 23 has two RCA audio jacks; module 24 is blank; and module 25 has three BNC jacks. The number of modules in a level, and the particular types and numbers of devices on each module, can be arranged by persons skilled in the art, in light of this teaching.

As noted, the modules of level 40 have greater height than those of level 20. Thus, for a given axial width, each of modules 41–44 in level 40 can accommodate a greater number of devices thereon than the modules of level 20. In this embodiment, module 41 is shown to have four RCA audio jacks, module 42 has two UHF jacks; module 43 is blank; and module 44 is provided with a pilot light 45 and a rocker switch 46.

Level 70 is shown in this embodiment as having at least two modules, 71 and 72. Module 71 is similar to those discussed above with respect to levels 20 and 40, and is provided with three toggle switches 75. Module 72 is an electronic subsystem, such as a video monitor which may be used as a monitor, or as a display device, illustratively for an oscilloscope or spectrum analyzer. Of course, other types of such electronic subsystems may be additionally or alternatively included in the patchboard, without departing from the claimed invention. Such electronic subsystems further include tuners, amplifiers, noise reducers, crossovers, video and audio switches, microcomputers and peripheral equipment, remote control signal receivers, signal recorders, digital displays, etc.

The illustrative side-to-side arrangement of modules is supported by a plurality of rails 51, 52, and 53. In this embodiment, rails 51, 52, and 53 are cross-sectionally identical to one another, each rail having an upper groove 55 and a lower groove 56. Grooves 55 and 56 are arranged axially parallel with their respective rails, and adapted to engage edge protrusions 58 on each of the modules. As shown in FIG. 1, each of the modules in levels 20 and 40 is provided with axially-oriented protrusions 58 on opposite edges thereof, each for engaging a respective one of grooves 55 or 56 on their associated rails. A lowermost rail 75 is shown having only a single groove 76. Thus, not all of the rails need be adapted to accommodate modules on both sides thereof.

Each of rails 51, 52, and 53 is further provided, in this embodiment, with a frontal groove 60 which can accommodate a label (not shown) which identifies an adjacent module. In addition, a back-groove 62 on each rail is adapted to receive a screw 64 which secures a side bar 65 to the rails. Of course, in other embodiments, the screw may be accommodated in a tapped bore on the end of the rail, or any other known suitable affixation means may be employed. A similar arrangement (not shown) may be provided on the other end of the patchboard.

FIG. 2 is a cross-sectional representation of the embodiment of FIG. 1 taken along line II—II while the embodiment is in an assembled state. As shown in FIG. 2, modules 23, 42, and 72 are shown stacked on one another with rails 52 and 53, which are shown in cross-section, interposed therebetween. This figure further shows with clarity the manner in which edge protrusions 58 of the modules engage grooves 55 and 56 of the elongated rails. Frontal grooves 60 are shown to have a cross-sectional configuration which permits an identification label 67 in the form of a strip to be held therein without the need for an adhesive backing. In this specific embodiment, the connectors mounted on modules 23 and 42 are shown to have terminals (not specifically designated) for permitting backside wiring to be soldered to the connectors.

FIG. 3 shows a side view of a module, such as module 2, which is provided with a UHF connector 70. In this embodiment, connector 70 is of the single-sided type which is provided at a rear portion with terminals 72 and 73 for connecting a cable 75 by soldering. The front portion of connector 70 is adapted to couple with a patch wire 76.

FIG. 4 shows an alternative embodiment of module 21 wherein connector 70 is provided with a rear portion 71 which is adapted for coupling with a connector-terminated patch wire 80. In this embodiment, the connections on either side of the module can be disconnected and reconfigured easily.

Referring once again to the embodiment of FIG. 1, the arrangement of modules can be completely or partially rearranged by simply unfastening an appropriate one, or several, of the rails. Moreover, if additional capacity is required, an additional level of modules can be added by adding only one additional rail. Alternatively, the arrangement can be elongated by coupling additional lengths of rail to the original rails, or by simply replacing the rails with longer ones.

FIG. 5 is a perspective, exploded view of two modules 80 and 81 which are arranged to have a filler strip 90 interposed therebetween. As with the previously described embodiments, modules 80 and 81 have protrusions 58 which enable engagement with the elongated rails. In some embodiments, filler strip 90 may be flat on both sides and be held in place between the modules by simple compression. In the present, shown embodiment, however, filler strip 90 has a relatively thick central portion 91 with generally flat wing portions 92. The modules are provided with grooves 83 which accommodate central portion 91 of the filler strip when the structure is assembled. The filler strip may be formed of a compressible, elastomeric material which will take up the tolerances if the ends of the modules are not perfectly finished. Of course, any cross-sectional configuration may be provided for central portion 91, and grooves 83 can be configured accordingly. In addition, the grooves and the thick central portion need not be centered in the depth of the panel, but may be at unequal distances from the front and back faces of the modules.

Although the invention has been described in terms of specific embodiments, it is to be understood that persons skilled in the art can generate additional embodiments without departing from the spirit or exceeding the scope of the claimed invention. The drawings and descriptions of the invention in this disclosure should therefore be viewed as merely illustrative, and not in a limiting sense.

What is claimed is:

1. A modularized selectively alterable patchboard for electrical devices comprising:
   a plurality of electrical connector rows, each row comprising a plurality of discrete modules, each module having two or more substantially parallel mounting edges, at least one module in each row having at least one electrical connector disposed between said substantially parallel mounting edges thereof;
   a plurality of elongated rails slidably engaging said modules, at least one rail disposed between and aligned with a first electrical connector row and a second electrical connector row and having a first mounting surface which is aligned with and slidably engages one of the mounting edges of each of the modules in said first row and a second mounting surface which is aligned with and slidably engages one of the mounting edges of each of the modules in said second row;
   a detachable connecting member holding the rails.

2. A modularized selectively alterable patchboard for electrical devices in accordance with claim 1 wherein the mounting edges of the modules are of a random length whereby the modules are alterably interchangeable.

3. A modularized selectively alterable patchboard for electrical devices in accordance with claim 2 wherein each of said modules has a front face portion disposed between said mounting edges, and the front face portions of the modules are aligned in substantially the same plane to form with the rails a smooth surface from which said electrical connectors protrude.

4. A modularized selectively alterable patchboard for electrical devices in accordance with claim 1 wherein at least one rail has a groove along the front side thereof for slidably engaging labels.

5. A modularized selectively alterable patchboard for electrical devices in accordance with claim 1 wherein at least one module has at least one single sided electrical connector disposed between the first and second mounting edges thereof.

6. A modularized selectively alterable patchboard for electrical devices in accordance with claim 1 wherein at least one module has at least one double sided electrical connector disposed between the first and second mounting edges thereof.

7. A modularized selectively alterable patchboard for electrical devices in accordance with claim 1 wherein at least one module has an electronic component disposed between the first and second mounting edges thereof.

8. A modularized selectively alterable patchboard for electrical devices in accordance with claim 1 wherein at least one module is blank.

9. A modularized selectively alterable patchboard for electrical devices in accordance with claim 1 further including at least one filler strip disposed between two of the elongated rails and adjacent one of the modules.

* * * * *